US006625338B2

(12) United States Patent
Shen et al.

(10) Patent No.: US 6,625,338 B2
(45) Date of Patent: Sep. 23, 2003

(54) OPTICAL NRZ-RZ FORMAT CONVERTER

(75) Inventors: Alexandre Shen, Paris (FR); Fabrice Devaux, Montrouge (FR); Michael Schlak, Berlin (DE); Tolga Tekin, Berlin (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/852,175

(22) Filed: May 10, 2001

(65) Prior Publication Data

US 2002/0018612 A1 Feb. 14, 2002

(30) Foreign Application Priority Data

May 23, 2000 (FR) .............................. 00 06548

(51) Int. Cl.$^7$ ................................ G02B 6/26
(52) U.S. Cl. ........................ 385/15; 359/181
(58) Field of Search ................... 359/181, 188; 385/15

(56) References Cited

U.S. PATENT DOCUMENTS

| 5,978,129 | A | * | 11/1999 | Jourdan et al. | ............. | 359/326 |
| 6,323,992 | B1 | * | 11/2001 | Ueno | ......................... | 359/179 |
| 6,335,813 | B1 | * | 1/2002 | Janz et al. | ................... | 359/245 |
| 6,384,954 | B1 | * | 5/2002 | Webb | ......................... | 359/245 |

OTHER PUBLICATIONS

K. Takayama, et al. IOOC–ECOC '91. 17$^{th}$ European Conference on Optical Communication ECOC '91. 8$^{th}$ International Conference on Integrated Optics and Optical Fibre Communication IOOC '91, pp. 77–80, "An All-Optical 10-GHZ LD-Based Clock Regenerator Using A Mach-Zehnder-Interferometer-Type NRZ-TO-RZ Converter", Sep. 9–12, 1991.

C. Kolleck, et al., Journal of Lightwave Technology, vol. 15, No. 10, pp. 1906–1913, "All-Optical Wavelength Conversion of NRZ and RZ Signals Using A Nonlinear Optical Loop Mirror", Oct. 1, 1997.

S. Bigo, et al., Electronics Letters, vol. 30, No. 12, pp. 984–985, "Bit-Rate Enhancement Through Optical NRZ-TO-RZ Conversion and Passive Time-Division Multiplexing For Soliton Transmission Systems", Jun. 9, 1994.

A.D. Ellis, Electronics Letters, vol. 28, No. 4, pp. 405–406, "Ultrafast All Optical Switching In Two Wavelength Amplifying Nonlinear Optical Loop Mirrror", Feb. 13, 1992.

D. Norte, et al., IEEE Photonics Technology Letters, vol. 8, No. 5, pp. 712–714, "Experimental Demonstrations of All-Optical Conversions Between The RZ and NRZ Data Formats Incorporating Noninverting Wavelength Shifting Leading to Foramt Transparency", May 1996.

* cited by examiner

Primary Examiner—Robert H. Kim
Assistant Examiner—Richard Kim
(74) Attorney, Agent, or Firm—Sughrue Mion, PLLC

(57) ABSTRACT

Converter of an NRZ signal with a bit duration T comprising an interferometric structure (10) with two arms (9, 11) equipped with a medium (13, 15) with an index that varies depending on the optical power passing through the said medium. The NRZ signal to be converted is input into each of the arms (9, 11). The output signal (7) from the structure is reinput through a means (16) introducing a delay of T/2 in one of the arms (11).

The signal at the output (7) is then the NRZ signal converted to the RZ format.

12 Claims, 4 Drawing Sheets

OPTICAL NRZ-RZ FORMAT CONVERTER

FIELD OF THE INVENTION

The field of the invention is "all-optic" converters to convert an input signal in the NRZ format to an output signal in the RZ format. It also relates to a conversion process.

TECHNOLOGICAL BACKGROUND

All-optic transmission systems, and particularly wavelength division multiplexed WDM networks use different modulations and different data formats. Two standard data formats are fairly widespread. These are the Non Return to Zero (NRZ) format and the Return to Zero (RZ) format. As explained in page 359 of the manual entitled "Optique et Télécommunication—Transmission et traitement optique de l'information (Optics and Telecommunications—Transmission and optical information processing)" by A. COZANET et al. Published by EYROLLES, 1983, in a Non Return to Zero system a "one" level is transmitted by a high level throughout the duration of the bit transmission time, and a "zero" is transmitted by a low level during this duration; in a Return to Zero system, a "one" is transmitted by a high level for part of the period, usually the first half of the transmission time of the bit followed by a low level, and a "zero" is transmitted by a low level throughout the duration of the bit.

This simple description shows that the number of pulses transmitted for a set of data will be greater for the RZ format than for the NRZ format. In an NRZ format, a continuous sequence of "ones" will require a high level signal throughout the duration of the transmission of this sequence, namely one long pulse.

In the Return to Zero format, a sequence of "ones" will be represented by a sequence of pulses. Similarly, an isolated "one" in the RZ format will produce a pulse half as long as the length of the pulse in the NRZ format, assuming that the bit time is of the same duration for the two formats, such that the transmission of the RZ format will require a larger pass bandwidth.

For all these reasons, the pass band necessary to transmit the same data is twice as wide for the RZ format as for the NRZ format.

Therefore, it can be seen that the NRZ format does have an undoubted advantage compared with other formats that require a greater bandwidth for the same transmission speed.

However, the RZ format is also useful in some applications, for example multiplexing, demultiplexing by passive time division, soliton generation and deletion of the BRILLOUIN stimulated dispersion.

This is why converters from one format to the other are necessary to benefit from the advantages of both formats.

For example, one first known example of this type of converter is briefly described in an article in "Electronics Letters" on Feb. 13 1992 (vol. 28, No. 4, pages 405, 406) written by A. D. Ellis and D. A. Cleland and entitled "Commutation tout optique ultra rapide dans un miroir boucle optique non lineaire (NOLM) (Ultra rapid all-optic switching in a non-linear optical loop mirror)". As shown in FIG. 1 in this article, the device comprises a SAGNAC anti-resonance interferometer.

Inputs to the interferometer consist firstly of a regular pulse stream and secondly a signal in the Non Return to Zero format representative of a data signal.

The power of the two signals is chosen such that if only one of these signals is present, in other words is at the high level, a destructive interference occurs such that the signal at the output from the interferometer is low which corresponds to normal operation of a SAGNAC interferometer considering the phase delay between the signal in the forward direction and the signal in the reverse direction resulting from the birefringent nature of the fibre. However, when the two signals are high, which has the effect of doubling the total optical power, an additional phase of $\pi$ is caused by modulation of the high power signal propagating in the reverse direction and therefore by constructive interference at the output from the interferometer.

The device thus behaves like an "and" gate.

Depending on the pass band of a filter located at the output from the interferometer, an RZ signal resulting from conversion of the NRZ signal can be obtained either on a carrier at the wavelength carrying the pulse stream, or at the wavelength carrying the NRZ signal.

A second embodiment of the NRZ-RZ converter is described in an article by S. BIGO, E. DESURVIRE, S. GAUCHARD and E. BRUN entitled "Amélioration de débit par conversion optique NRZ-RZ et multiplexage par division temporelle passive pour les systèmes à transmission soliton (Improvement of flow by NRZ-RZ optical conversion and multiplexing by passive time division for soliton transmission systems)" published in the "Electronics Letters" journal Jun. 9, 1994 (vol. 30, No. 12, pages 984–985). In the following, we will only consider the NRZ-RZ conversion described in this article. As in the previous case, a non-linear optical loop mirror is used. Also as in the previous case, two signals are input into the loop forming a SAGNAC interferometer. Firstly, a control signal is input at a wavelength $\lambda c$, and secondly an NRZ signal is input at wavelength $\lambda s$. An interferometer polarization controller is adjusted to minimize the output signal when the control signal is low in order to obtain a SAGNAC interferometer. After amplification, the control signal is input into the loop forming an interferometer through an 80/20 coupler located close to the point of sharing between the forward wave and the reverse wave.

The authors report that with this passive loop, in other words a loop that does not comprise an optical amplifier in the loop as in the previous example, they can obtain an RZ signal after conversion of the input NRZ signal.

The pulse width of the RZ signal is also slightly less than the width of the control pulses at wavelength $\lambda c$.

However, the difference in level between the low level and the high level is more than 20 dB, representing an improvement by a factor of 10 compared with the previous example with active loop.

Note that in the two examples described above, the fibre loop mirrors are very sensitive to the light polarization and temperature fluctuations.

A third example embodiment is mentioned in an article by David NORTE and Allan E. WILLNER entitled "Démonstration expérimentale d'une conversion tout optique entre des données aux formats RZ et NRZ incorporant des changements non inverseurs de longueur d'onde et conduisant à une transparence du format (Experimental demonstration of an all-optic conversion between data in the RZ and NRZ formats including changes that do not invert the wavelength and leading to format transparency)" published in "IEEE photonics technology Letters" (vol. No. 8, No. 5, May 1996, pages 712–714).

The device mentioned in this article applies to an RZ-NRZ converter according to the diagram shown in FIG. 1 of this article. The description of the device and its operation is not very clear because an optical amplifier SOA1 mentioned in the text is not shown in the figure. However, it can be understood that the first step is to recover the clock signal from the RZ signal. It is also explained that a device not described is used to change from an NRZ format to an RZ format such that either of the two formats can be used.

Each of the devices described or mentioned in these articles are subsystems that include several opto-electronic or electronic devices and require assembly work.

As mentioned above, devices based on SAGNAC interferometers are sensitive to fluctuations in temperature and light polarization. All devices described in these articles require a clock signal or a clock recuperation.

Therefore, there is a need for an NRZ-RZ conversion device that is easy to design and make.

BRIEF DESCRIPTION OF THE INVENTION

The basic idea of the invention is to use an interferometric structure, for example a Mach-Zehnder structure with two arms (a first arm and a second arm). At least the first or the second arm comprises an element in which the optical index can vary as a function of the optical power present in this element, for example a semi conducting optical amplifier (SOA).

An NRZ signal (Se) is injected on one input of the interferometer, such that this signal is distributed in each of the interferometer arms in a balanced manner. If no control signal is input into an arm in which the index varies with optical power, the input signal(Se) is unchanged on one of the interferometer outputs. However, if a control signal (Sc) is input into this arm of the interferometer and if the level of this control signal (Sc) is well chosen, an index change exactly equal to the quantity necessary to put the optical signals output from the two arms of the interferometer into phase opposition, in other words with a phase shift of $(2k+1)\pi$ with respect to each other, can be obtained in the element for which the optical index varies as a function of the optical power present in this element. In this instantaneous configuration, the two signals output from the input signal (Se) present in each of the arms of the interferometer cancel each other at the output from the interferometer. Therefore for the input signal (Se), the interferometer behaves like an optical gate that is opened by a control signal (Sc). According to the invention, this phenomenon is used to convert a signal from the NRZ format into a signal in the RZ format, without using an optical clock signal. This is done by inputting the signal at the output from the interferometer into one of the arms of the structure, while applying a time delay to it approximately equal to half of the time bit of the NRZ signal. The delayed output signal is thus used as a control signal to close or open the optical gate described above. The time delay removes the optical power in the interferometer output signal for a time. As will be seen in more detail later, the result is an output signal corresponding to the input signal but in the RZ format.

Thus, the invention is related to a converter to convert a signal in the NRZ format with a bit duration of T, into a signal in the RZ format, characterized in that it comprises:

an interferometric structure with two arms, a first arm and a second arm, each of the arms having two ends, a first end and a second end, at least one of the arms of the interferometer containing a medium for which the value of the optical index is variable as a function of the optical power passing through the said medium, this interferometric structure having at least one input and at least one output one of the inputs being intended to receive the NRZ signal to be converted, one of the outputs carrying a signal resulting from interference between a signal present in the first arm and a signal present in the second arm;

the converter also comprising:

coupling means for coupling to an output from the interferometric structure, and an arm of the said structure containing the medium for which the value of the optical index is variable as a function of the optical power delay means placed between the said output from the interferometric structure and the said coupling means, the said delay means causing a delay equal to approximately T/2.

Preferably, the active media for which the refraction index is sensitive to the power that passes through them are composed of active layers of a semi conducting optical amplifier.

The time bit for high transmission speeds is very short (of the order of the few tens of a picosecond) and, for example, the delay input to the output signal reinput into one of the arms can be achieved by means of an optical guide integrated on a substrate of the interferometer or a component, for example an optical amplifier that also performs the function of adjusting the level of the output signal before reinputting it into one of the arms of the interferometric structure.

The output signal from the interferometric structure may be input onto the end of the arm of the structure into which the NRZ signal to be converted is also input, such that the two signals propagate in this arm in the same direction. In this case, it will be preferable to convert the signal output from the structure into a wavelength to prevent interference between these two signals occurring in the said arm.

The output signal from the interferometric structure can also be input to one end of the arm of the structure opposite to the end into which the NRZ structure is input. In this case, it may or may not be possible to convert the output signal from the interferometric structure into a wavelength before it is input into the said arm of the structure.

Preferably, if there is no signal from the output from the structure, the optical paths of the two arms of the structure are equal, thus creating constructive interference between the signals present in each of the arms.

Preferably, means placed between the output from the structure and one of the arms adjust the optical power level of the signal at the output so as to modify the optical path of one of the arms compared with the other to obtain destructive interference.

The invention also relates to a process for conversion of a signal in the NRZ format with a bit duration T into a signal in the RZ format characterized in that:

the signal to be converted is input into each of the arms of an interferometric structure, each of the arms of the structure containing an optical medium for which the value of the index is variable as a function of the optical power passing through the said medium, a signal present at the output from the said structure is input into only one of the arms of the said structure, delayed by a value equal to about half a bit duration, the RZ signal resulting from the conversion of the NRZ signal is collected at the said output.

BRIEF DESCRIPTION OF THE DRAWINGS

Example embodiments of the invention will now be described with reference to the attached drawings in which identical references denote elements performing the same function. In these drawings.

EXAMPLE EMBODIMENTS

Figure 1:
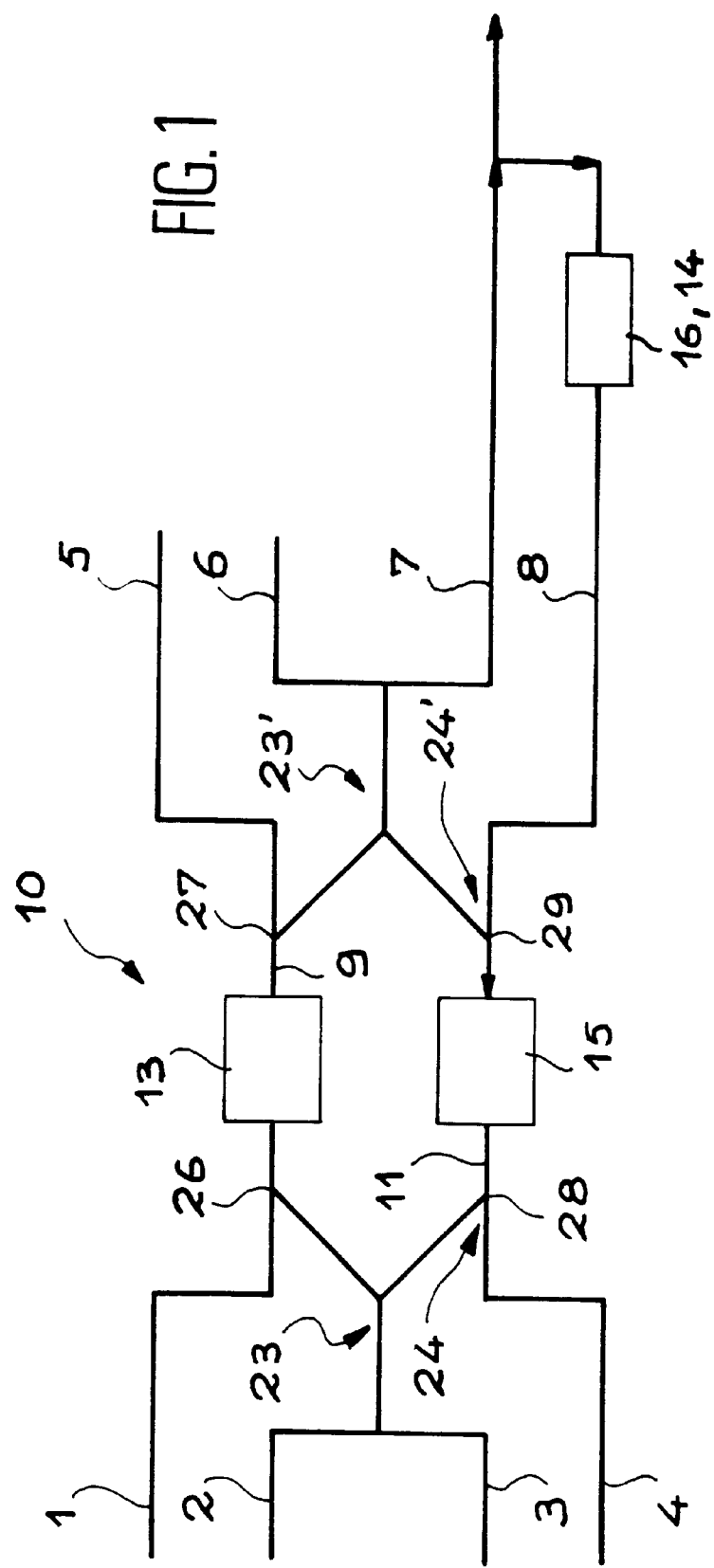
FIG. 1 diagrammatically represents a first example embodiment of the invention, in which the output signal is reinput onto one arm of the structure at one end of this arm opposite the end at which the NRZ signal is input into this arm.

FIG. 1 diagrammatically shows a first example embodiment of an NRZ-RZ converter according to the invention.

This converter uses an interferometric structure 10 known in itself that will be described below. This structure is symmetric and has two control inputs 1, 4 with their symmetric inputs 5, 8, two signal inputs 2–3 with their symmetric inputs at output 6–7. Inputs 2 and 3 are coupled to each of the arms 9, 11 of the structure.

Each arm has two ends, namely first ends 26, 28 respectively and second ends 27, 29 respectively.

Figure 3:
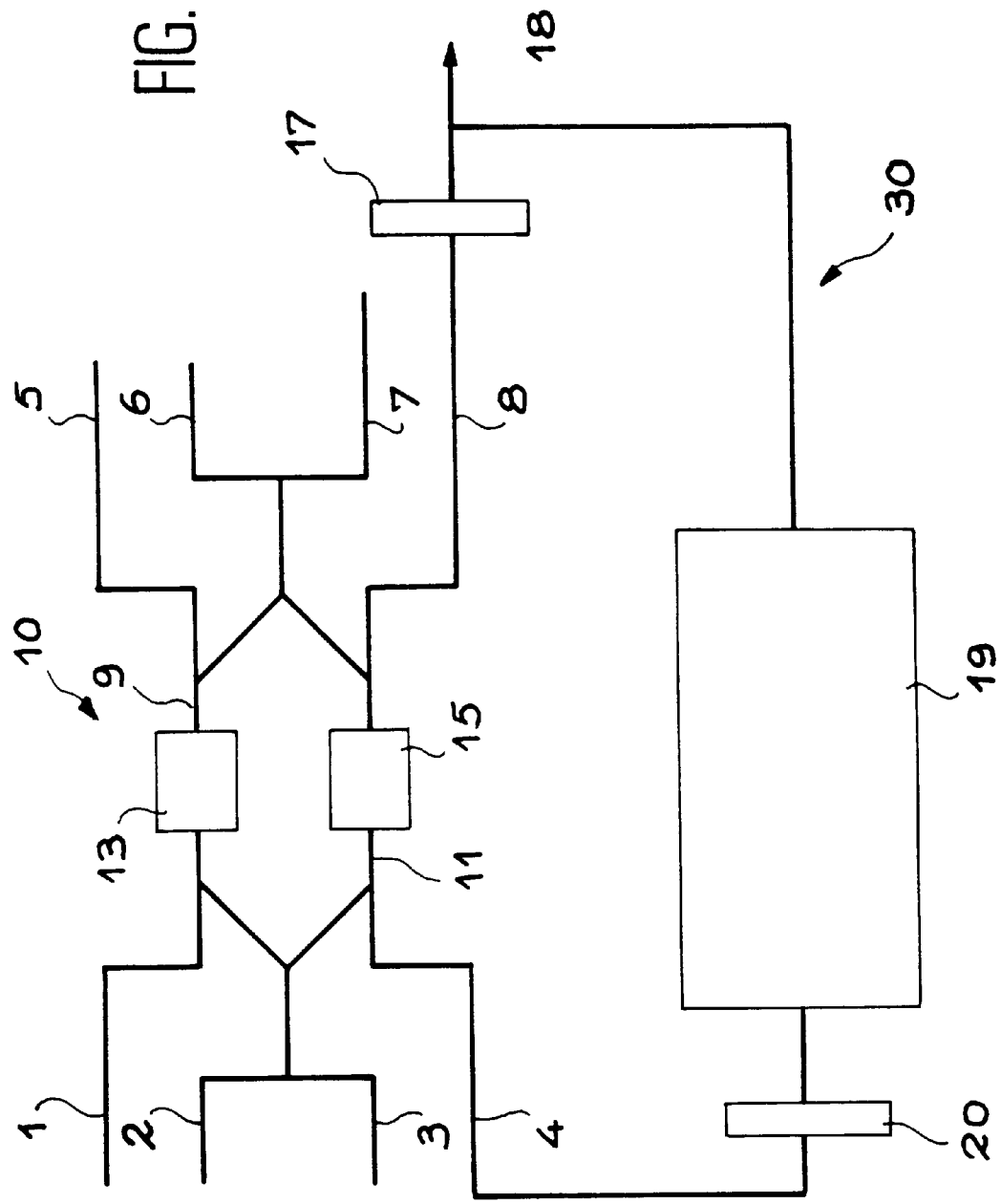
FIG. 3 shows an example embodiment in which the output signal is converted into a wavelength and reinput on the same end of the arm of the structure as the end into which the NRZ signal is input, and, FIG. 4 represents the same example embodiment as shown in FIG. 3, but with an example embodiment of the wavelength converter.
Figure 4:
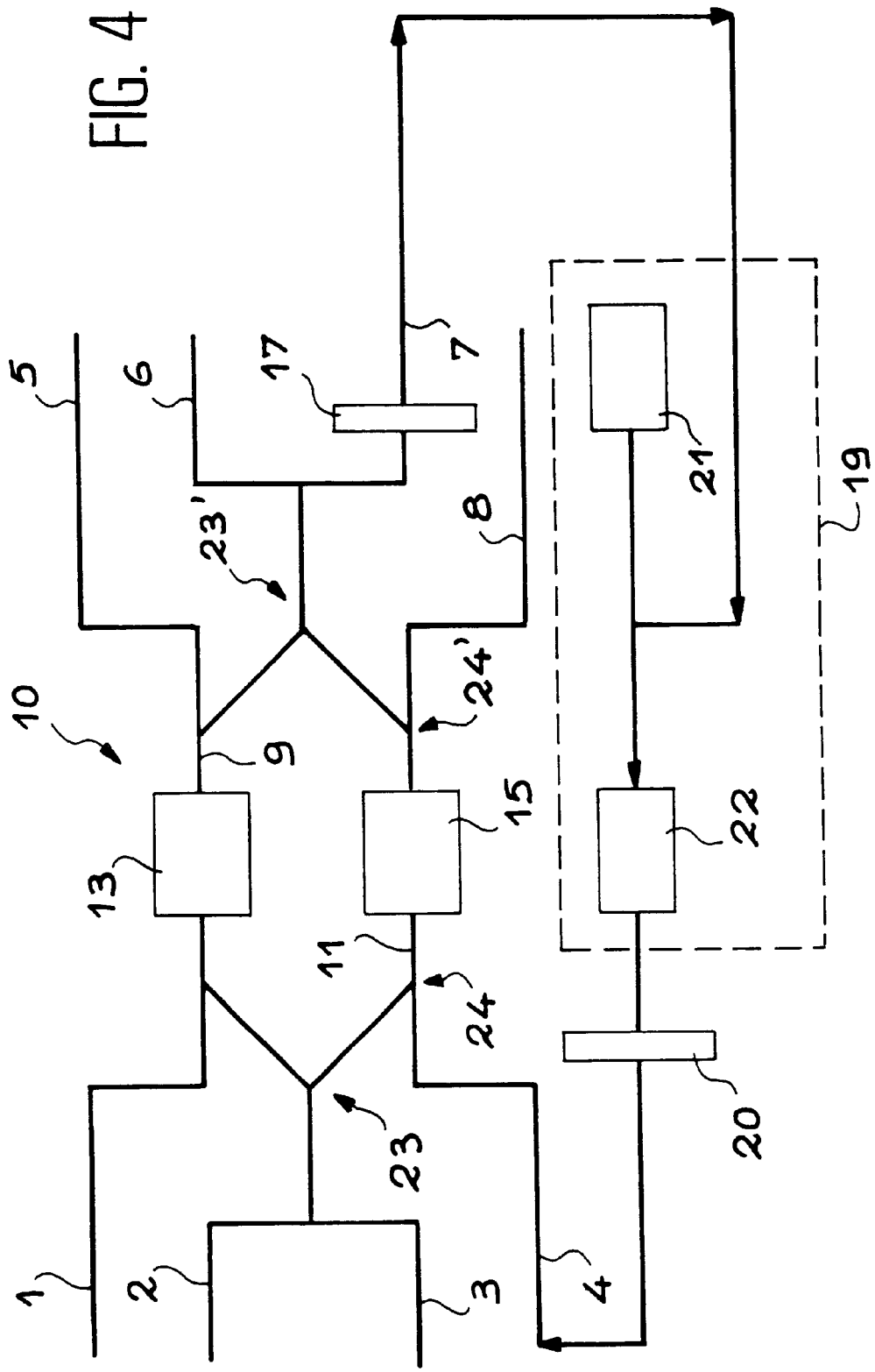

In the example embodiments of the invention, inputs 2, 3 are firstly coupled to each other, and are then separated and coupled as shown in FIGS. 1, 3 and 4 to each of the arms 9, 11. These coupling means forming the input coupling to each of the arms 9, 11 are marked as reference 23. They form a 2 to 2 coupler. Symmetrically on the output side, the coupling means are composed of another 2 to 2 coupler marked 23'.

The control inputs 1, 4 are each coupled to one of the arms 9, 11 such that a signal input on these arms by these inputs propagates in the arm from the first end to the second end of this arm.

Similarly, the control inputs 5, 8 are each coupled to one of the arms 9, 11 respectively. Signals input for example through the control input 5 propagate from the second end 27 of the arm 9 to the first end 26 of this arm. In the example shown in FIGS. 1, 3 and 4, all that is used are control inputs 4 and 8. Only the means of coupling these inputs to each of the ends 28, 29 respectively of arm 11 have been referenced 24 and 24' respectively.

Each of the arms 9, 11 is provided with an optical medium 13, 15 with an index that varies with the optical power passing through it, in the form of an active layer of a semi conducting amplifier.

The output level from this type of structure as a function of the levels of signals present on the signal inputs and control inputs are represented by the following tables:

| | | | | |
|---|---|---|---|---|
| level of control input 4 or 8 | 0 | 0 | 1 | 1 |
| level of signal input 2 | 0 | 1 | 0 | 1 |
| level of output 7 | 0 | 1 | 0 | 0 |
| level of control input 1 or 5 | 0 | 0 | 1 | 1 |

| -continued | | | | |
|---|---|---|---|---|
| level of signal input 3 | 0 | 1 | 0 | 1 |
| level of output 6 | 0 | 1 | 0 | 0 |

The operating principle of the device is summarized in the two truth tables above. If there is no control signal (in other words the level of the control input is 0) the signal at the input 3 is reproduced at the output 6. When the control signal is high, in other words equal to 1, an input signal at level 0 or at level 1 is transformed into an output signal at level 0.

In the rest of this presentation, it will be assumed that the signal input is input 2, and the control input is either input 4 or 8 coupled to the first or second end of the arm 11 respectively.

Figure 2:
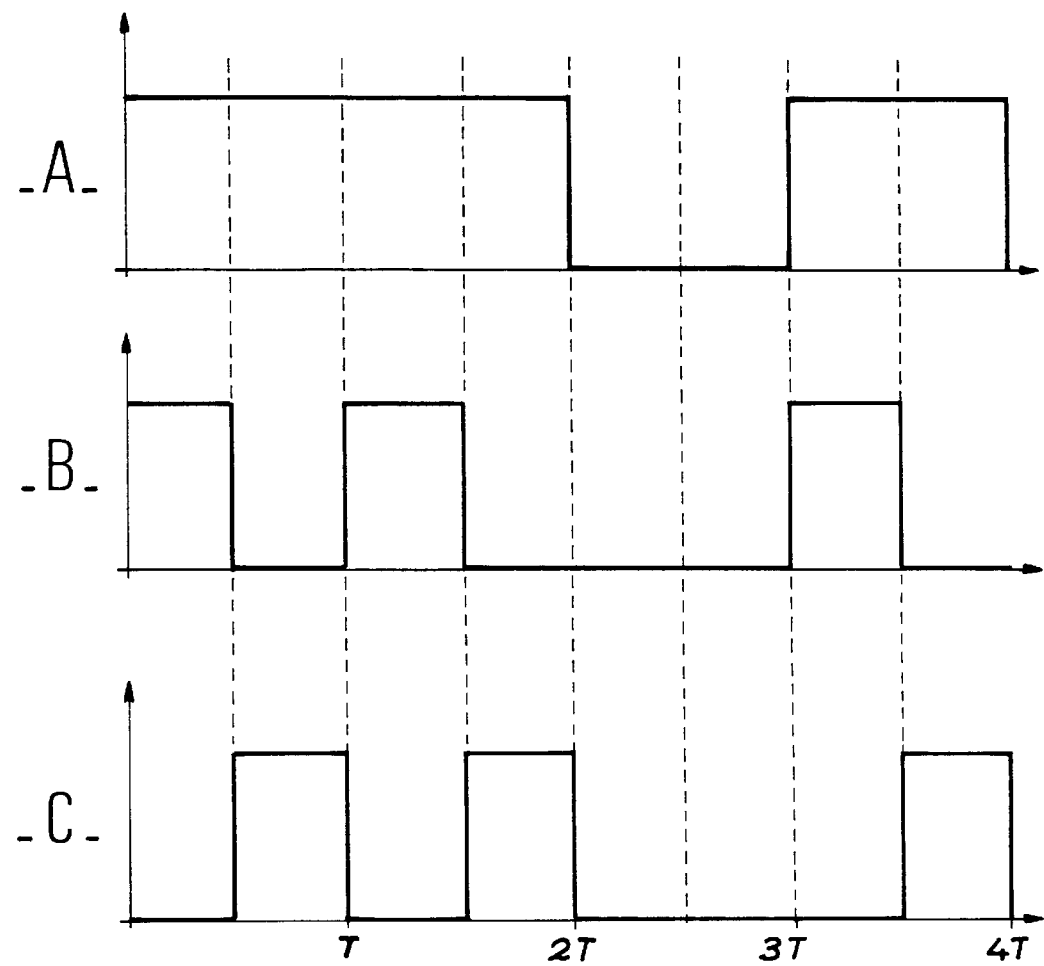
FIG. 2 represents signal levels with time. It comprises parts A, B and C. Part A represents an NRZ signal, part C represents a fictitious signal that would be present at the output from the interferometric structure if there were no delay means, and part B represents the RZ signal produced by conversion of the NRZ signal shown in part A.

This results in a transformation of the input signal as shown in FIG. 2.

This figure comprises 3 parts A, B and C. Part A represents variations in time of the level of an NRZ signal, for which the bit duration is T. It is assumed that this type of signal is applied to input 2.

It is assumed that the signal present on output 7 is input onto the control input 4 or 8 delayed by a value T/2, in other words half a bit duration. This fictitious signal is shown in part C. Under these conditions, the NRZ signal converted into an RZ signal is obtained as shown in FIG. 1 part B. The NRZ/RZ transformation is thus self-maintained.

FIG. 1 shows an embodiment in which an NRZ signal is input on input 2 and passes through arms 9 and 11 from their first ends 26, 28 to their second ends 27, 29 respectively.

The output signal 7 is reinjected onto the control input 8 with a delay time equal to a half-period of the bit time T. Note that if, for example, the bit rate is equal to 10 Gigabits, the bit time is $10^{-10}$ seconds, namely 100 picoseconds. Under these conditions, a delay of T/2 is equal to 50 picoseconds. This type of delay can be obtained with only 1 cm of optical fibre or with a 5 m long InP guide.

Preferably, the signal at output 7 is reamplified so that it can be set to a suitable level to obtain a level close to saturation of the active optical medium 15 of the amplifier present on arm 11.

In this case, an optical amplifier 14 into which the optical signal at the signal output 7 is input, is used as an amplifier 14 and as a T/2 delay means 16.

In the embodiment shown in FIG. 1, the return signal delayed by T/2 is applied to the control input 8 such that this signal propagates in this arm in the opposite direction to the NRZ signal applied to input 2. Therefore this reinput signal is propagated from the second end 29 of arm 11 to the first end 28.

Under these conditions, although the return signal is at the same wavelength, it does not interfere with the NRZ signal to be transformed. All it does is to change the power level in the active medium 15 of the optical amplifier of arm 11 at appropriate moments. The converted RZ signal is located on a carrier at the same wavelength as the input NRZ signal.

FIG. 3 represents an embodiment of the invention with the advantage that it can change the wavelength of the signal controlling the power passing through the optical amplifier 15.

The device shown in FIG. 3 comprises a device 10 as shown in FIG. 1 comprising elements denoted as references 1–9, 11–13 and 15, 23–24'.

The output 7 leads to a filter 17. The output signal from the filter 17 powers a return loop 30 comprising a wavelength converter 19 that preferably powers the control input 4 through a pass band filter 20. Preferably, the converter 19 comprises means of adjusting the output level from this converter.

The advantage of a converter of this type is that the control signal does not interfere with the input signal.

Filter 17 at the output 7 from device 10 is a pass band filter centred on the carrier wavelength of the NRZ signal.

The filter 20 at the output from the converter 19 is a pass band filter centred on the wavelength of the control signal generated or received by the converter 19.

FIG. 4 shown an example embodiment of the wavelength converter 19.

The wave is generated at the control wavelength, for example by means of laser diode 21. The output signal from diode 21 in the form of a non-modulated continuous wave is coupled to the output signal from filter 17 and the two signals are input into a semi conducting optical amplifier 22 with an active medium sensitive to the optical power passing through it. Under these conditions, if the input power to each of the signals input into the amplifier 22 is such that the saturation value is reached when the value of the modulated signal from filter 17 is high, then the continuous wave output from diode 21 is modulated like this signal. As mentioned above, the transit time in the converter 19 should be adjusted such that it is approximately equal to T/2.

FIGS. 3 and 4 show the device according to the invention with the output from converter 19 coupled to the first end 28 of the arm 11. Naturally, it can also be coupled to the second end 29, such that the NRZ signal and the control signal propagate in the opposite direction.

It should also be understood that the control signal in the invention is also the output signal, in other words the RZ signal resulting from the conversion of the NRZ signal.

In order to understand the design of a converter, the appendix contains the assumed formulas describing the operation of semi conducting optical amplifiers.

The gain $G_0$ before the amplifier is saturated given by the following formula $$G_0 = e^{(g_0 L)}$$

in which $g_0$ is a coefficient and L is the optical wavelength of the active medium.

The phase $\Phi$ added by the amplifier acting at the saturation power is $$\Phi = -\frac{\alpha}{2} L_n(G_0)$$

in which $\alpha$ is Henry's coefficient for the active laser medium of the amplifier and $L_n$ is the Naperian Logarithm function.

The gain G at saturation is given by:

$$G = e^{\left(\frac{g_0 L}{1 + P/P_s}\right)}$$

in which P is the "input power of the amplifier, $P_s$ is the saturation power, and L is the length of the active medium.

The phase shift is given by:

$$\Phi = -\frac{\alpha}{2} L_n(G)$$

The transfer functions $H_{D_0}$ and $H_{D_1}$ are given by the following formulas:

$$H_{D_0} = \frac{P_{D_0}}{P_{A_0}} \left| \left[ \frac{D_0}{A_0} \right]_{A_I=0} \right|^2$$
$$= G_1 \cos^2 K_1 \cos^2 K_2 + G_2 \sin^2 K_1 \sin^2 K_2 -$$
$$2\sqrt{G_1 G_2} \cos K_1 \cos K_2 \sin K_1 \sin K_2 \cos \Delta\Phi$$

and $$H_{D_1} = \frac{P_{D_1}}{P_{A_0}} \left| \left[ \frac{D_1}{A_1} \right]_{A_I=0} \right|^2$$
$$= G_1 \cos^2 K_1 \sin^2 K_2 + G_2 \sin^2 K_1 \cos^2 K_2 +$$
$$2\sqrt{G_1 G_2} \cos K_1 \cos K_2 \sin K_1 \sin K_2 \cos \Delta\Phi$$

in which:
  $P_{D_0}$ is the optical power at the output from arm 6 (FIG. 1);
  $P_{D_1}$ is the optical power at the output from arm 7;
  $P_{A_0}$ is the optical power applied to the art at input 2;
  $D_0$ is the optical field at output 6;
  $D_1$ is the optical field at output from arm 7;
  $A_0$ is the optical field at input 2;
  $A_1$ is the optical field at input 3 (for example 3, FIG. 1);
  $G_1$ is the amplifier gain, for example 13;
  $G_2$ is the gain of the other amplifier 15;
  $K_1$ and $K_2$ are the values of the coefficients determined from the following formula for amplifiers 13 and 15 respectively:

$$K = \frac{2\pi}{\lambda} L$$

in which $\lambda$ is the wavelength of a wave passing through the medium, and finally $$\Delta\Phi = \Phi_2 - \Phi_1 = -\frac{\alpha}{2} L \frac{G_2}{G_1}$$

What is claimed is:
1. A converter for the conversion of a signal in an NRZ format with a bit duration of T, into a signal in an RZ format, the converter comprising:
  an interferometric structure with a first arm and a second arm, each of the arms having a first end and a second end and at least one of the first or the second arms containing a medium for which a value of an optical index is variable as a function of an optical power passing through said medium, the interferometric structure having at least one input and at least one output, one of the said at least one inputs of the structure being configured to receive the NRZ signal to be converted, one of the said at least one outputs carrying a signal resulting from interference between a signal present in the first arm and a signal present in the second arm;
  the converter further comprising:
    a coupling means for coupling said signal carried by the output of the interferometric structure to an arm of the interferometric structure containing the medium for which the value of the optical index varies as a function of the optical power; and
    a delay means placed between the output from the interferometric structure and the coupling means, the delay means causing a delay equal to approximately T/2.
2. The converter according to claim 1, wherein the medium for which the value of the optical index varies as a function of a value of the optical power passing therethrough is composed of at least one active layer of at least one optical amplifier.

3. The converter according to claim 1, wherein the delay means between the output of the interferometric structure and at least one of the arms of the interferometric structure comprises an optical amplifier.

4. The converter according to claim 1, wherein the coupling means is placed at one end of the arm opposite to an end of the arm into which the signal being converted is input.

5. The converter according to claim 4, further comprising a first filter provided between the output side of the output of the interferometric structure and the input side of a wavelength converter, and a second filter provided between an output from the wavelength converter and the coupling means.

6. The converter according to claim 1, wherein the coupling means is disposed at the same end of the arm of the interferometric structure into which the NRZ signal being converted is input, such that the output signal from the interferometric structure and the NRZ signal being converted propagate in the same direction.

7. The converter according to claim 6, further comprising a wavelength converter provided between the output from the interferometric structure at the coupling means.

8. The converter according to claim 1, characterized in that when no signal from the output from the interferometric structure is present, the optical paths of each of the two arms of the interferometric structure are equal, creating constructive interference between any signals present in each of the arms.

9. The converter according to claim 1, further comprising optical power level adjustment means provided between the output from the interferometric structure and at least one of the arms to adjust the optical power level of the signal at the output to modify the optical path of at least one of the arms relative to the optical path of the other arm, to obtain destructive interference.

10. A process for conversion of a signal in an NRZ format with a bit duration T into a signal in an RZ format comprising the steps of:

inputting the signal being converted into an interferometric structure having at least a first arm and a second arm, wherein each arm of the interferometric structure receiving as input the signal being converted, each of the arms of the structure containing an optical medium having an optical index which varies as a function of the optical power passing through the medium, delaying a signal present at an output from the interferometric structure by a value equal to approximately half a bit duration;

inputting the delayed signal into only one arm of the interferometric structure; and collecting a resulting RZ signal, converted from the inputted NRZ format signal, at an output of the interferometric structure.

11. The process for conversion of a signal according to claim 10, further comprising inputting the delayed signal into only one arm with a direction of propagation opposite to the direction of propagation of the NZR format signal being converted.

12. The process according to claim 10, further comprising converting the delayed signal into a wavelength; and inputting the delayed signal into only one arm with the same direction of propagation the same as the direction of propagation of the NRZ format signal being converted.

* * * * *